United States Patent
Lu et al.

(10) Patent No.: US 11,574,104 B2
(45) Date of Patent: Feb. 7, 2023

(54) ANALOG CELLS UTILIZING COMPLEMENTARY MOSFET PAIRS

(71) Applicant: Taiwan Semiconductor Manufacturing Co., Ltd., Hsinchu (TW)

(72) Inventors: Chung-Ting Lu, Kaohsiung (TW); Chih-Chiang Chang, Taipei (TW); Chung-Peng Hsieh, New Taipei (TW); Chung-Chieh Yang, Zhubei (TW); Yung-Chow Peng, Hsinchu (TW); Yung-Shun Chen, Hsinchu (TW); Tai-Yi Chen, Hsinchu (TW); Nai Chen Cheng, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 219 days.

(21) Appl. No.: 17/135,565

(22) Filed: Dec. 28, 2020

(65) Prior Publication Data

US 2021/0224459 A1 Jul. 22, 2021

Related U.S. Application Data

(63) Continuation of application No. 16/527,295, filed on Jul. 31, 2019, now Pat. No. 10,878,160.

(51) Int. Cl.
*G06F 30/392* (2020.01)
*G06F 30/36* (2020.01)
(Continued)

(52) U.S. Cl.
CPC ............ *G06F 30/392* (2020.01); *G06F 30/36* (2020.01); *G06F 30/367* (2020.01); *G06F 30/394* (2020.01)

(58) Field of Classification Search
CPC .... G06F 30/392; G06F 30/367; G06F 30/394; G06F 30/36
(Continued)

(56) References Cited

U.S. PATENT DOCUMENTS

| 5,838,583 | A | * | 11/1998 | Varadarajan | .......... G06F 30/392 716/135 |
| 7,665,054 | B1 | * | 2/2010 | Gopalakrishnan | .... G06F 30/392 716/133 |
| 7,823,116 | B2 | * | 10/2010 | Chan | ...................... G06F 30/39 716/124 |

(Continued)

FOREIGN PATENT DOCUMENTS

CN 113536728 A * 10/2021 ........... G06F 30/392

*Primary Examiner* — Suresh Memula
(74) *Attorney, Agent, or Firm* — Sterne, Kessler, Goldstein & Fox P.L.L.C.

(57) ABSTRACT

An electronic design flow generates an electronic architectural design layout for analog circuitry from a schematic diagram. The electronic design flow assigns analog circuits of the schematic diagram to various categories of analog circuits. The electronic design flow places various analog standard cells corresponding to these categories of analog circuits into analog placement sites assigned to the analog circuits. These analog standard cells have a uniform cell height which allows these analog standard cells to be readily connected or merged to digital standard cells which decreases the area of the electronic architectural design layout. This uniformity in height between these analog standard cells additionally provides a more reliable yield when compared to non-uniform analog standard cells.

20 Claims, 15 Drawing Sheets

(51) Int. Cl.
*G06F 30/367* (2020.01)
*G06F 30/394* (2020.01)

(58) Field of Classification Search
USPC .......................................................... 716/102
See application file for complete search history.

(56) References Cited

U.S. PATENT DOCUMENTS

| | | | | |
|---|---|---|---|---|
| 8,799,841 | B2 * | 8/2014 | Reddy | G06F 30/36 |
| | | | | 716/132 |
| 10,474,782 | B1 * | 11/2019 | Lin | G06F 30/392 |
| 10,878,160 | B1 * | 12/2020 | Lu | G06F 30/36 |
| 11,416,660 | B1 * | 8/2022 | Kapoor | G06F 30/3308 |
| 2005/0240889 | A1 * | 10/2005 | Andreev | G06F 30/392 |
| | | | | 716/122 |
| 2007/0022399 | A1 * | 1/2007 | Tsai | G06F 30/30 |
| | | | | 716/102 |
| 2007/0083842 | A1 * | 4/2007 | Namba | G06F 30/392 |
| | | | | 716/112 |
| 2008/0016483 | A1 * | 1/2008 | Chan | G06F 30/39 |
| | | | | 716/132 |
| 2009/0300570 | A1 * | 12/2009 | Chan | G06F 30/39 |
| | | | | 716/119 |
| 2009/0307640 | A1 * | 12/2009 | Chapman | G06F 30/3323 |
| | | | | 716/136 |
| 2013/0042216 | A1 * | 2/2013 | Loh | G06F 30/36 |
| | | | | 716/119 |
| 2013/0219353 | A1 * | 8/2013 | Henrickson | G06F 30/394 |
| | | | | 716/122 |
| 2018/0150592 | A1 * | 5/2018 | Chang | G06F 30/392 |
| 2019/0148284 | A1 * | 5/2019 | Aipperspach | G06F 30/30 |
| | | | | 716/120 |
| 2019/0211475 | A1 * | 7/2019 | Ito | G06F 30/36 |
| 2019/0319022 | A1 * | 10/2019 | Song | H01L 27/092 |
| 2020/0104459 | A1 * | 4/2020 | Tong | G06F 30/392 |
| 2022/0067266 | A1 * | 3/2022 | Chen | G06F 30/394 |

* cited by examiner

ANALOG CELLS UTILIZING COMPLEMENTARY MOSFET PAIRS

CROSS-REFERENCE TO RELATED APPLICATIONS

The present application is a continuation of U.S. patent application Ser. No. 16/527,295, filed Jul. 31, 2019, now U.S. Pat. No. 10,878,160, which is incorporated herein by reference in its entirety.

BACKGROUND

Advances in technology and engineering have allowed designers and manufacturers to offer more electronic devices to consumers. Design for manufacturability (DFM) represents a general engineering practice of designing electronic devices that are easy to manufacture. DFM describes the process of designing electronic devices to facilitate the fabrication process to manufacture electronic devices that are easier, faster, and less expensive to make, while maintaining required standards of functionality, quality, and marketability. It is becoming more common to mix analog circuitry and digital circuitry of electronic devices onto a single semiconductor substrate. However, analog layouts for the analog circuitry are often non-uniform which can lead to the density gradient effect (DGE). These analog layouts often have high density areas, also referred to as high gradient areas, situated next to low density areas of digital layouts. In some situations, these high density areas can cause manufacturing defects, such as short circuits or open circuits to provide some examples, within the electronic devices during the manufacturing process. To avoid these high density areas, designers of the analog circuitry often increase the real-estate on the single semiconductor substrate dedicated for the analog circuitry to reduce the density of these analog layouts. But, this increased real-estate often leads to larger devices operating with more power for the analog layouts and increases routing distances within the electronic devices.

BRIEF DESCRIPTION OF THE DRAWINGS

Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

DETAILED DESCRIPTION

Figure 1A:
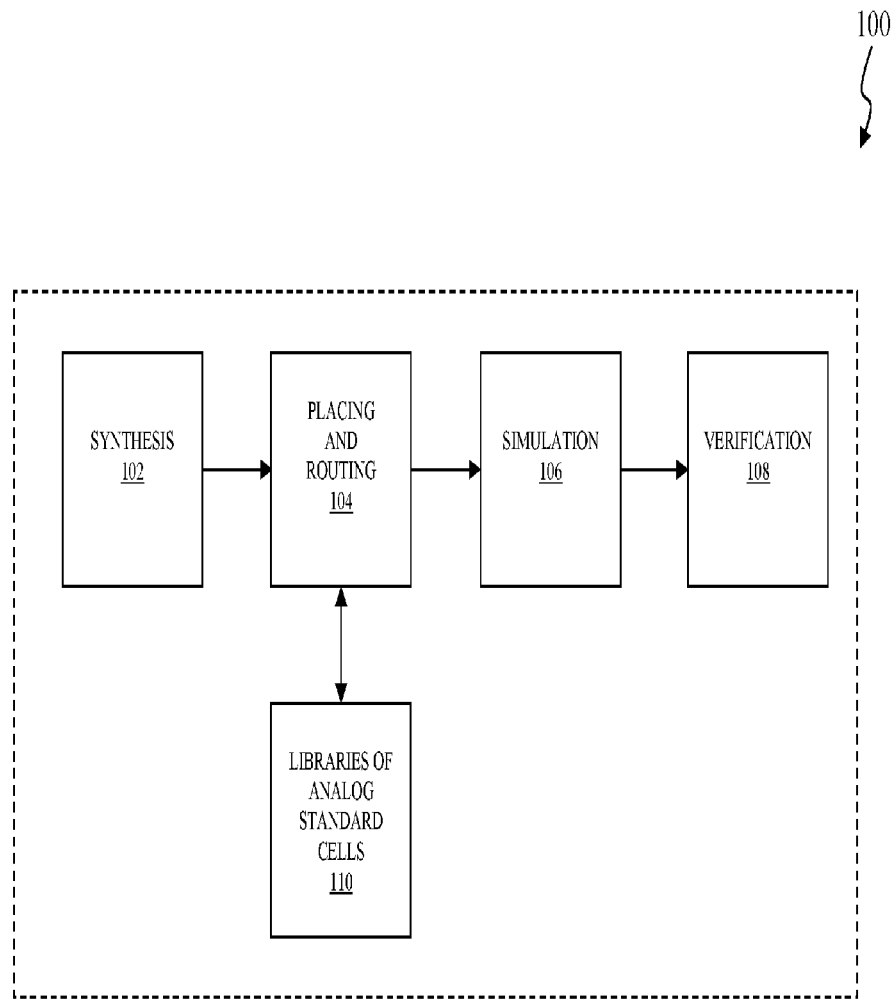
FIG. 1A through FIG. 1F illustrate a block diagram of an electronic design platform and its operation according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

OVERVIEW

An electronic design flow generates an electronic architectural design layout for analog circuitry from a schematic diagram. The electronic design flow assigns analog circuits of the schematic diagram to various categories of analog circuits. The electronic design flow places various analog standard cells corresponding to these categories of analog circuits into analog placement sites assigned to the analog circuits. These analog standard cells have a uniform cell height which allows these analog standard cells to be readily connected or merged to digital standard cells which decreases the area of the electronic architectural design layout. This uniformity in height between these analog standard cells additionally provides a more reliable yield when compared to non-uniform analog standard cells.

Exemplary Electronic Design Platform

FIG. 1A through FIG. 1F illustrate a block diagram of an electronic design platform and its operation according to an exemplary embodiment of the present disclosure. As illustrated in FIG. 1A, an electronic design platform 100 represents an electronic design flow including one or more electronic design software applications, that when executed by one or more computing devices, processors, controllers, or other devices that will be apparent to those skilled in the relevant art(s) without departing from the spirit and the scope of the present disclosure, can design, simulate, analyze, and/or verify one or more high-level software level descriptions of analog and/or digital circuitry for an electronic device. In an exemplary embodiment, the one or more high-level software level descriptions can be implemented using a high-level software language, such as a graphical design application, for example C, System C, C++, LabVIEW, and/or MATLAB, a general purpose system design language, such as like SysML, SMDL and/or SSDL, or any other suitable high-level software or general purpose system design language that will be apparent to those skilled in the relevant art(s) without departing from the spirit and the scope of the present disclosure, or a high-level software format, such as Common Power Format (CPF), Unified Power Formant (UPF), or any other suitable high-level software format that will be apparent to those skilled in the relevant art(s) without departing from the spirit and the scope of the present disclosure. In the exemplary embodiment illustrated in FIG. 1A, the electronic design platform 100 includes a synthesis application 102, a placing and routing application 104, a simulation application 106, a verification application 108, and libraries of analog standard cells 110.

Moreover, embodiments of the disclosure can be implemented in hardware, firmware, software, or any combination thereof. Embodiments of the disclosure can also be implemented as instructions stored on a computer-readable medium, which can be read and executed by one or more processors. A computer-readable medium can include any mechanism for storing or transmitting information in a form readable by a machine (e.g., a computing device). For example, a computer-readable medium can include non-transitory computer-readable mediums such as read only memory (ROM); random access memory (RAM); magnetic disk storage media; optical storage media; flash memory devices; and others. As another example, the computer-readable mediums can include transitory computer-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc. In an exemplary embodiment, the synthesis application 102, the placing and routing application 104, the simulation application 106, and the verification application 108 represent one or more electronic design software applications, which when executed by one or more computing devices, processors, controllers, or other devices that will be apparent to those skilled in the relevant art(s) without departing from the spirit and the scope of the present disclosure, configure the one or more computing devices, the processors, the controllers, or the other devices from being general purpose electronic devices into special purpose electronic devices to execute one or more of these applications as to be described in further detail below.

The synthesis application 102 translates one or more characteristics, parameters, or attributes of the electronic device into one or more logic operations, one or more arithmetic operations, one or more control operations, and/or any other suitable operation or operations that will be apparent to those skilled in the relevant art(s) without departing from the spirit and the scope of the present disclosure into the one or more high-level software level descriptions in terms of analog circuitry and/or digital circuitry of the electronic device. The synthesis application 102 can utilize a simulation algorithm to simulate the one or more logic operations, one or more arithmetic operations, one or more control operations, and/or the other suitable operation or operations to verify the one or more logic operations, one or more arithmetic operations, one or more control operations, and/or the other suitable operation perform in accordance with one or more characteristics, parameters, or attributes of the electronic device as outlined in an electronic design specification.

The placing and routing application 104 translates the one or more high-level software level descriptions to form an electronic architectural design layout for the electronic device. In the exemplary embodiment illustrated in FIG. 1A, the placing and routing application 104 translates the one or more high-level software level descriptions into a schematic, or a schematic diagram. Generally, the schematic diagram includes analog circuits and/or digital circuits that are electrically coupled to each other to form a pictorial, or visual, representation of the analog circuitry and/or digital circuitry of the electronic device. The discussion to follow in FIG. 1B through FIG. 1E describes operation of the placing and routing application 104 in translating the analog circuitry of the schematic diagram to form an electronic architectural design layout for the analog circuitry of the electronic device. The placing and routing application 104 can translate the digital circuitry of the schematic diagram to form an electronic architectural design layout for the digital circuitry of the electronic device in accordance with any suitable known translation technique which will be apparent to those skilled in the relevant art(s) without departing from the spirit and scope of the present disclosure.

Figure 1B:
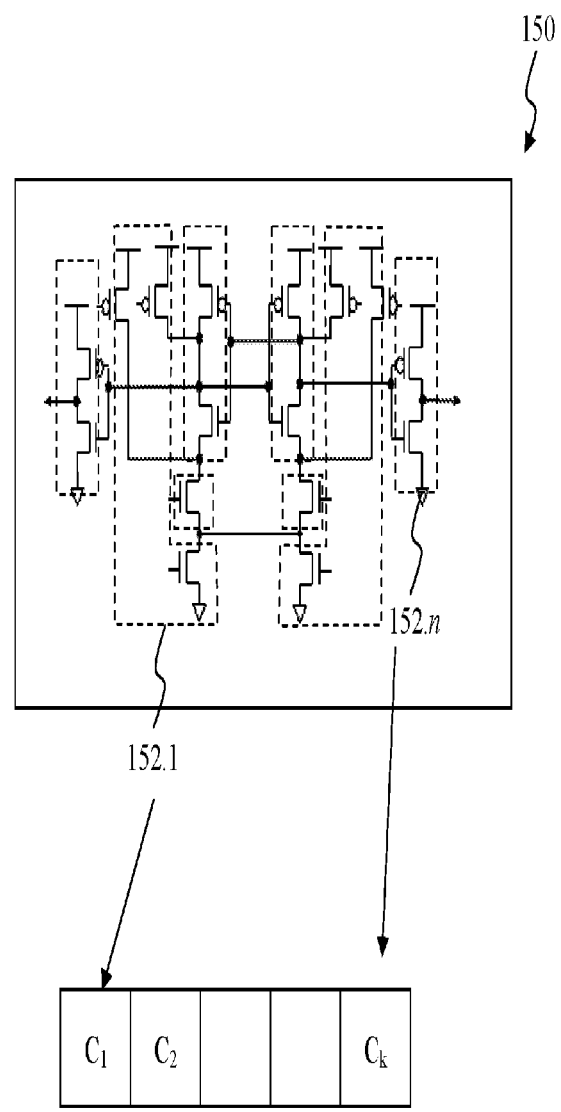

As illustrated in FIG. 1B, a schematic diagram 150 includes analog circuits 152.1 through 152.$n$ that are electrically coupled to each other to form the analog circuitry for the electronic device. The analog circuits 152.1 through 152.$n$ can be characterized based on common configurations and/or common arrangements between these analog circuits. These common configurations and/or common arrangements can include common input/output (I/O) relationships between the analog circuits, for example, common gate connections, common drain connections, common source connections, bulk connections, power connections, ground connections, and/or any combination thereof to provide some examples. Alternatively, or in addition to, these common configurations and/or common arrangements can include common topologies, such as common-gate amplifiers, common-drain amplifiers, common-source amplifiers, differential amplifiers, current mirrors, and/or any combination thereof to provide some examples.

In the exemplary embodiment illustrated in FIG. 1B, the placing and routing application 104 logically assigns the analog circuits 152.1 through 152.$n$ to categories of analog circuits $C_1$ through $C_k$. In this exemplary embodiment, each category of analog circuits from among the categories of analog circuits $C_1$ through $C_k$ is associated with a different common configuration and/or different common arrangement. In this exemplary embodiment, the placing and routing application 104 logically assigns each of the analog circuits 152.1 through 152.$n$ to a corresponding category of analog circuits from among the categories of analog circuits $C_1$ through $C_k$ that is associated with same common configuration and/or common arrangement as the analog circuit. In some situations, one or more of the categories of analog circuits $C_1$ through $C_k$ can be assigned to multiple analog circuits from among the analog circuits $C_1$ through $C_k$. In an exemplary embodiment, a user of the placing and routing application 104 analyzes the schematic diagram. In this exemplary embodiment, the placing and routing application 104 thereafter receives an input from a peripheral device, such as a keyboard, a mouse, and/or a stylus to provide some examples, to logically assign the analog circuits 152.1 through 152.$n$ to the categories of analog circuits $C_1$ through $C_k$ as described above.

Figure 1C:
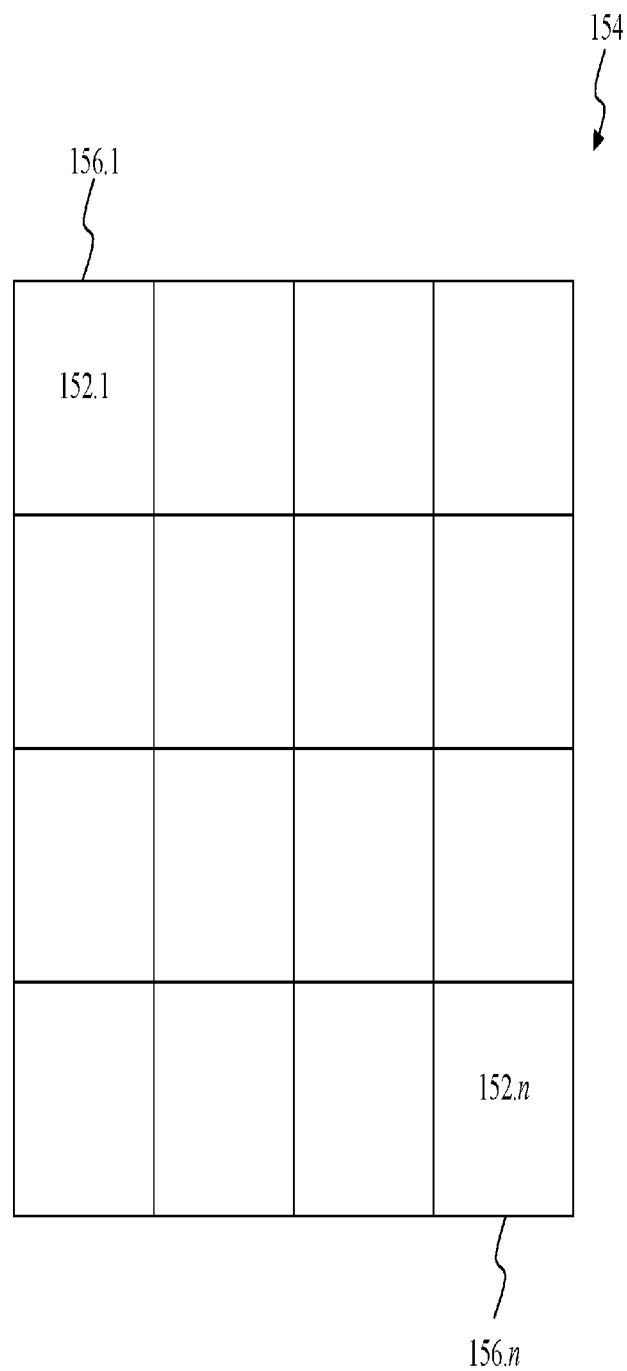

As illustrated in FIG. 1C, the placing and routing application 104 partitions real estate 154 from the electronic architectural design layout into analog placement sites 156.1 through 156.$n$ to develop a floor plan for placement of analog standard cells for the analog circuits 152.1 through 152.$n$. In an exemplary embodiment, the analog placement sites 156.1 through 156.$n$ can be characterized as having uniform cell height. For example, the analog placement sites 156.1 through 156.$n$ can be characterized as one cell height to accommodate a first horizontal active diffusion region for formation of p-type metal-oxide-semiconductor (PMOS) transistors and a second horizontal active diffusion region for formation of n-type metal-oxide-semiconductor (NMOS) transistors. In some situations, the first horizontal active diffusion region and the second horizontal active diffusion region can be parsed into multiple active diffusion regions for the formation of multiple PMOS transistors and multiple NMOS transistors, respectively. In the exemplary embodiment illustrated in FIG. 1C, the analog placement sites 156.1 through 156.n are arranged as a series of rows and a series of columns to form a matrix of analog placement sites. However, other arrangements of the analog placement sites 156.1 through 156.n are possible as will be apparent to those skilled in the relevant art(s) without departing from the spirit and scope of the present disclosure. The placing and routing application 104 thereafter assigns the analog circuits 152.1 through 152.n to corresponding analog placement sites from among the analog placement sites 156.1 through 156.n. In an exemplary embodiment, the placing and routing application 104 uses the schematic diagram 150 as illustrated in FIG. 1B as a roadmap to assign the analog circuits 152.1 through 152.n to their corresponding analog placement sites in the real estate 154 such that analog circuits from among the 152.1 through 152.n neighboring one another in the schematic diagram 150 similarly neighbor each other in the real estate 154.

Figure 1D:
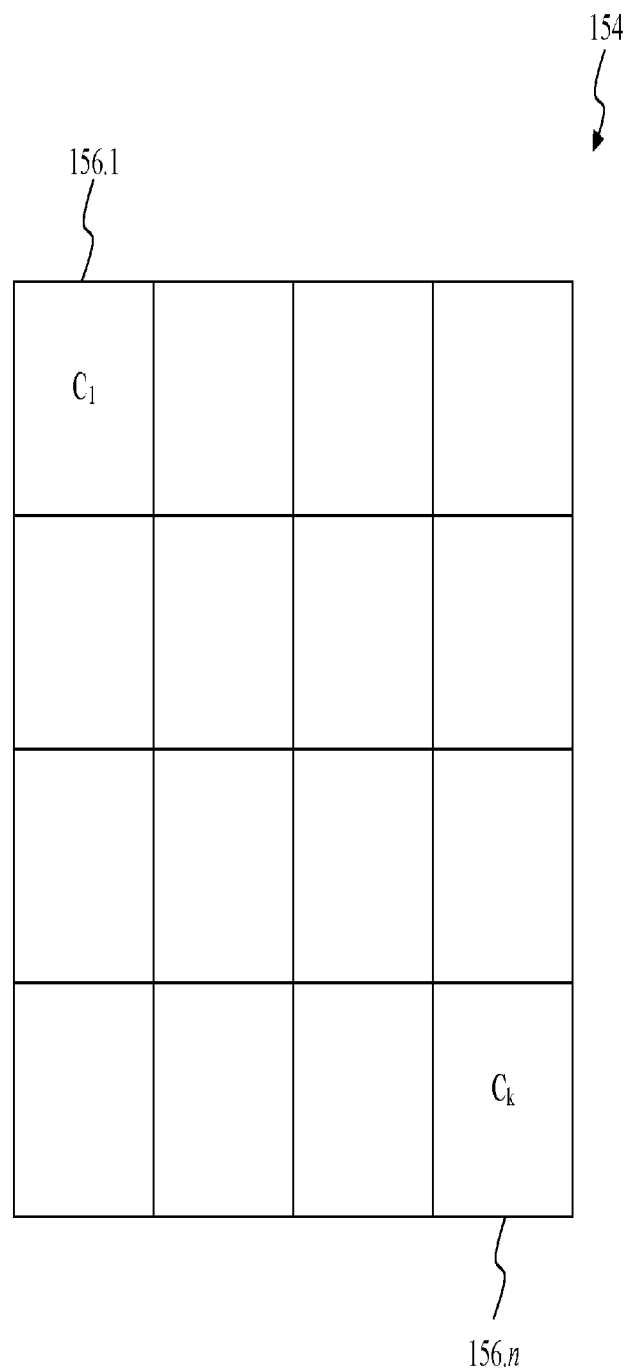

As illustrated in FIG. 1D, the placing and routing application 104 designates the analog placement sites 156.1 through 156.n as being associated with their corresponding categories of analog circuits from among the categories of analog circuits $C_1$ through $C_k$. In the exemplary embodiment illustrated in FIG. 1D, the analog circuit 152.1, which is assigned to the category of analog circuits $C_1$, is assigned to the analog placement site 156.1 and the analog circuit 152.n, which is assigned to the category of analog circuits $C_k$, is assigned to the analog placement site 156.n. In this exemplary embodiment, the placing and routing application 104 designates the analog placement site 156.1 with the category of analog circuits $C_1$ and the analog placement site 156.n with the category of analog circuits $C_k$.

Figure 1E:
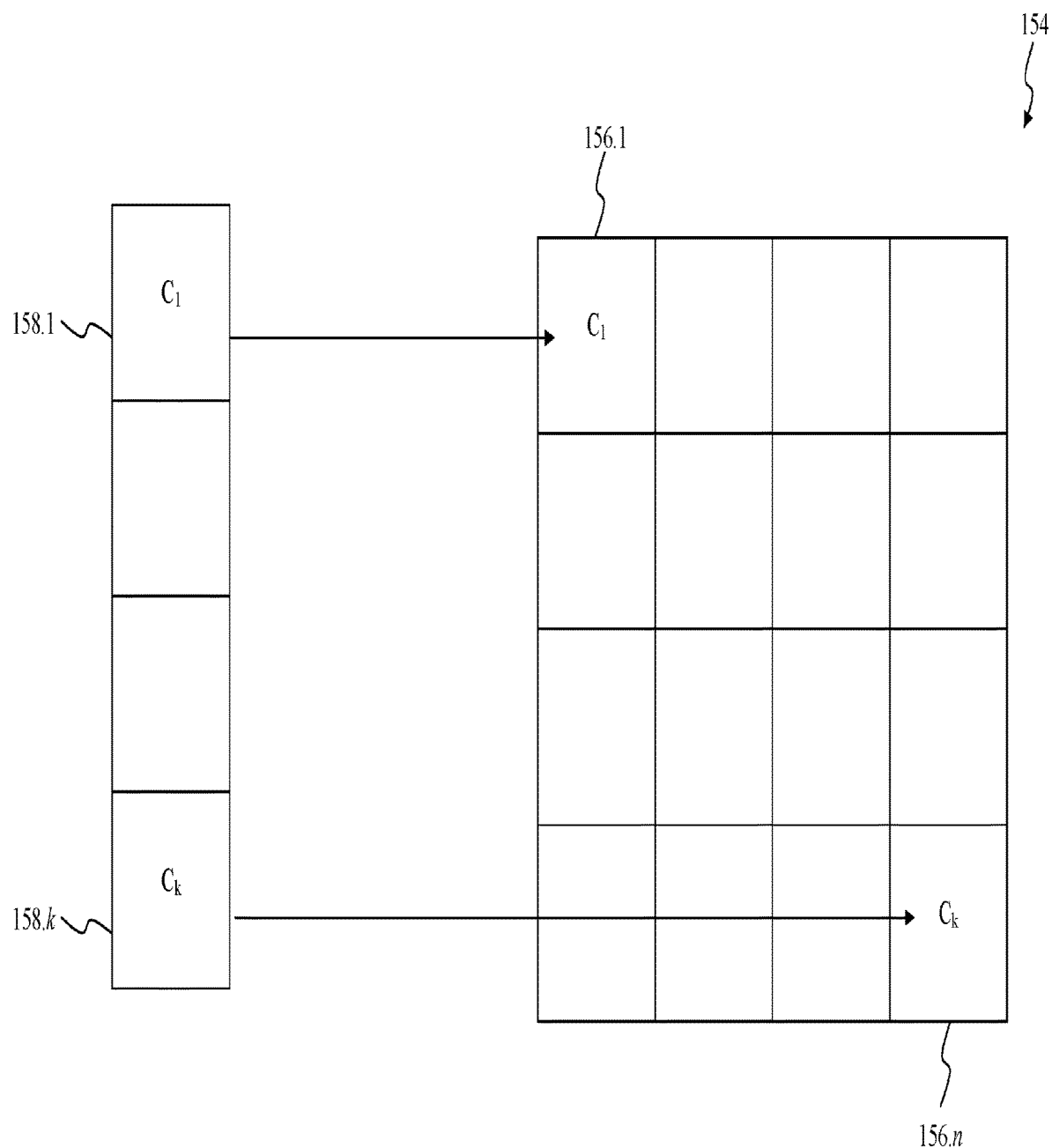

As illustrated in FIG. 1E, the placing and routing application 104 retrieves analog standard cells 158.1 through 158.k from the libraries of analog standard cells 110 as illustrated in FIG. 1A. In the exemplary embodiment illustrated in FIG. 1E, each analog standard cell from among the analog standard cells 158.1 through 158.k is associated with a category of from among the categories of analog circuits $C_1$ through $C_k$. The placing and routing application 104 thereafter places the analog standard cells 158.1 through 158.k into analog placement sites from among the analog placement sites 156.1 through 156.n which correspond to their categories of analog circuits $C_1$ through $C_k$. In the exemplary embodiment illustrated in FIG. 1E, the placing and routing application 104 retrieves the analog standard cell 158.1 which is associated with the category of analog circuits $C_1$ and places the analog standard cell 158.1 into the analog placement site 156.1 which is similarly assigned to the category of analog circuits $C_1$. Similarly, the placing and routing application 104 retrieves the analog standard cell 158.k which is associated with the category of analog circuits $C_k$ and places the analog standard cell 158.k into the analog placement site 156.n which is similarly assigned to the category of analog circuits $C_k$. Once the placing and routing application 104 places the analog standard cells 158.1 through 158.k, the placing and routing application 104 connects the analog standard cells 158.1 through 158.k in accordance with the schematic diagram 150 to form the electronic architectural design layout for the analog circuitry of the electronic device.

Figure 1F:
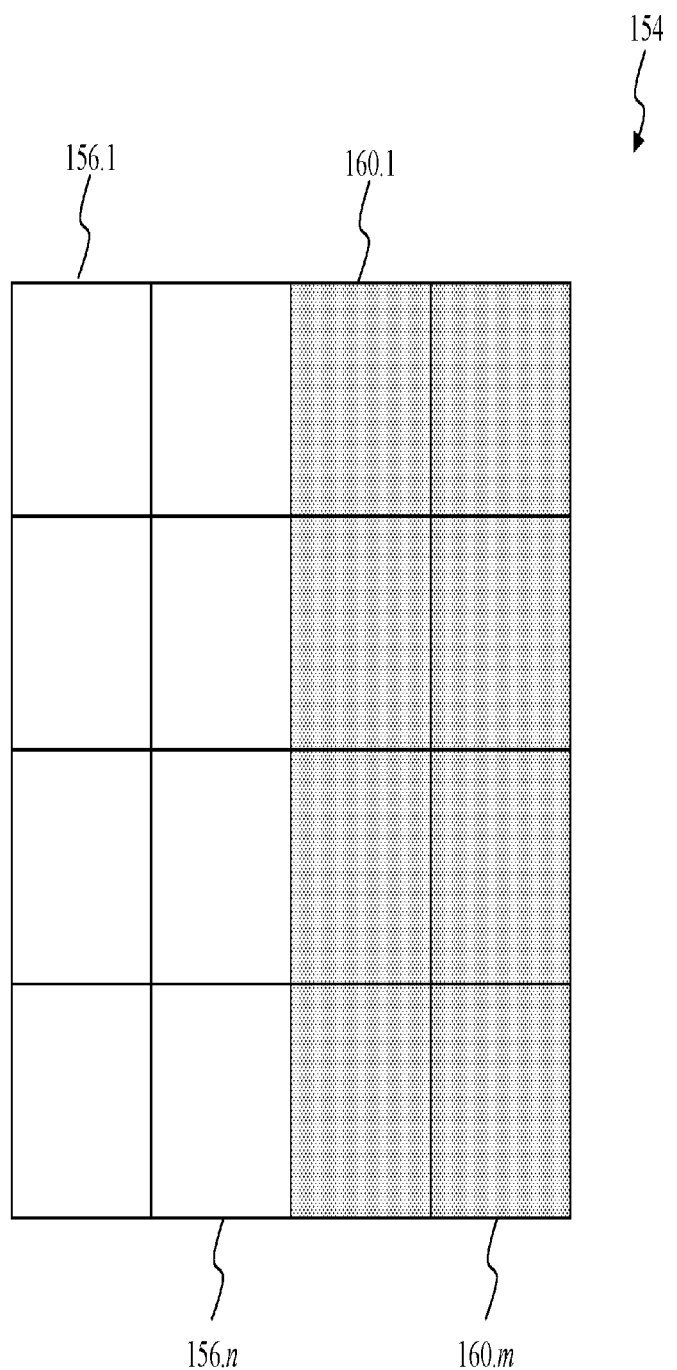

As illustrated in FIG. 1F, the schematic diagram 150 can further include digital circuits that are electrically coupled to each other to form the digital circuitry for the electronic device. In the exemplary embodiment illustrated in FIG. 1F, the placing and routing application 104 further partitions the real estate 154 from the electronic architectural design layout into digital placement sites 160.1 through 160.m, illustrated using a gray shading in FIG. 1F, to develop a floor plan for placement of digital standard cells for digital circuitry of the digital circuitry for the electronic device. In the exemplary embodiment illustrated in FIG. 1F, the digital placement sites 160.1 through 160.m are arranged as a series of rows and a series of rows to form a matrix of digital placement sites. However, other arrangements of the digital placement sites 160.1 through 160.m are possible as will be apparent to those skilled in the relevant art(s) without departing from the spirit and scope of the present disclosure. The placing and routing application 104 places digital standard cells into the digital placement sites 160.1 through 160.m according to the schematic diagram 150. The placing and routing application 104 connects these digital standard cells in accordance with the schematic diagram 150 to form the electronic architectural design layout for the digital circuitry of the electronic device. The placing and routing application 104 thereafter connects the electronic architectural design layout for the analog circuitry of the electronic device and the electronic architectural design layout for the digital circuitry of the electronic device according to the schematic diagram 150 to form the electronic architectural design layout for the electronic device.

As illustrated in FIG. 1F, the analog standard cells 158.1 through 158.k within the analog placement sites 156.1 through 156.n are compatible with digital standard cells within the digital placement sites 160.1 through 160.m. In an exemplary embodiment, the analog standard cells 158.1 through 158.k and the digital standard cells have a height of one standard cell. This uniformity in height between the analog standard cells and the digital standard can provide a more compact electronic architectural design layout for the electronic device when compared to other electronic architectural design layouts for the electronic device. In some situations, this allows the electronic architectural design layout for the analog circuitry of the electronic device and the electronic architectural design layout for the digital circuitry of the electronic device to share a common boundary instead of separate boundaries for the electronic architectural design layout for the analog circuitry of the electronic device and the electronic architectural design layout for the digital circuitry of the electronic device. Furthermore, this more compact electronic architectural design layout lessens the number of have high density areas within the electronic architectural design layout for the electronic device and the density gradient effect (DGE) within this electronic architectural design layout.

Referring back to FIG. 1A, the simulation application 106 simulates the electronic architectural design layout for the electronic device to replicate one or more characteristics, parameters, or attributes of the electronic architectural design for the analog circuitry and/or the digital circuitry of the electronic device. In an exemplary embodiment, the simulation application 106 can provide a static timing analysis (STA), a voltage drop analysis, also referred to an IREM analysis, a Clock Domain Crossing Verification (CDC check), a formal verification, also referred to as model checking, equivalence checking, or any other suitable analysis that will be apparent to those skilled in the relevant art(s) without departing from the spirit and the scope of the present disclosure. In a further exemplary embodiment, the simulation application 106 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis.

The verification application 108 verifies the one or more characteristics, parameters, or attributes of the electronic architectural design layout for the analog circuitry and/or the digital circuitry of the electronic device as replicated by the simulation application 106 satisfy the electronic design specification. The verification application 108 can also perform a physical verification, also referred to as a design rule check (DRC), to check whether the electronic architectural design layout for the analog circuitry and/or the digital circuitry of the electronic device satisfies one or more recommended parameters, referred to as design rules, as defined by a semiconductor foundry and/or semiconductor technology node for fabricating the electronic device.

The libraries of analog standard cells 110 include one or more libraries of analog standard cells, such as the analog standard cells 158.1 through 158.$k$ as described above in FIG. 1E, having different common configurations and/or different common arrangements. In the exemplary embodiment illustrated in FIG. 1A, these analog standard cells are defined in terms of geometric shapes, locations of the geometric shapes, and/or interconnections between the geometric shapes. In an exemplary embodiment, analog standard cells 158.1 through 158.$k$ have as a uniform cell height, for example, a height of one standard cell. In this exemplary embodiment, the height of one standard cell includes a first horizontal active diffusion region for formation of p-type metal-oxide-semiconductor (PMOS) transistors and a second horizontal active diffusion region for formation of n-type metal-oxide-semiconductor (NMOS) transistors. This uniformity in height between the analog standard cells can provide a more compact electronic architectural design layout for the electronic device when compared to other electronic architectural design layouts for the electronic device. In the exemplary embodiment illustrated in FIG. 1, this uniformity in height between the analog standard cells aligns uniform front-end-of-line (FEOL), middle-end-of-line (MEOL), and back-end-of-line patterns for these analog standard cells is similar to those of digital standard cells. For example, the analog standard cells have fixed cell height and cell boundary allowing these analog standard cells to be abutted to digital standard cells. As another example, the analog standard cells have fixed channel width and length comparable to digital standard cells. As a further example, the analog standard cells have a fixed metal width and spacing for power and signals comparable to digital standard cells. This more compact electronic architectural design layout lessens the number of have high density areas within the electronic architectural design layout for the electronic device and the density gradient effect (DGE) within this electronic architectural design layout. Moreover, this uniformity in height is further accomplished by implementing the electronic architectural design layout for the analog standard cells to include complementary metal-oxide-semiconductor field-effect (CMOS) transistor pairs of PMOS transistors and NMOS transistors. In some situations, the analog standard cells can include dummy PMOS transistors and/or dummy NMOS transistors, to be described in further detail below, to ensure the electronic architectural design layouts for these analog standard cells include CMOS transistor pairs. For example, an analog circuit from among the analog circuits 152.1 through 152.$n$ as described above in FIG. 1B can include a single NMOS transistor. In this example, the electronic architectural design layout of the analog standard cell associated with a category of analog circuits assigned to this analog circuit can include the electronic architectural design layout for a single NMOS transistor and a dummy PMOS transistor to form a CMOS transistor pair to ensure this analog standard cell maintains the height of one standard cell.

Exemplary Common Configurations and/or Common Arrangements

As described above in FIG. 1B, analog circuits, such as the analog circuits 152.1 through 152.$n$ to provide an example, can be characterized based on common configurations and/or common arrangements between these analog circuits. FIG. 2A through FIG. 2G illustrate exemplary common configurations and/or common arrangements according to exemplary embodiments of the present disclosure. Those skilled in the relevant art(s) will recognize the placing and routing application 104 can identify other common configurations and/or common arrangements than those illustrated in FIG. 2A through FIG. 2G without departing from the spirit and scope of the present disclosure. These other common configurations and/or common arrangements can include common gate connections, common drain connections, common source connections, bulk connections, power connections, ground connections, common-gate amplifiers, common-drain amplifiers, common-source amplifiers, differential amplifiers, current mirrors, and/or any combination thereof to provide some examples.

Figure 2A:
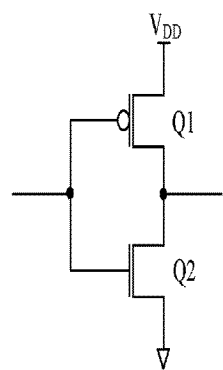
FIG. 2A through FIG. 2J illustrate exemplary common configurations and/or common arrangements according to exemplary embodiments of the present disclosure.

FIG. 2A illustrates an exemplary common gate and drain with power and ground connections. As illustrated in FIG. 2A, a gate and a drain of the PMOS transistor Q1 is connected to a gate and a drain, respectively, of the NMOS transistor Q2. A source of the PMOS transistor Q1 is connected to a power source $V_{DD}$. A source of the NMOS transistor Q2 is connected to a ground potential.

Figure 2B:
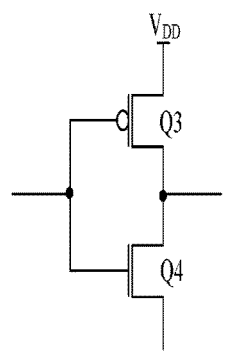

FIG. 2B illustrates an exemplary common gate and drain connections for a PMOS transistor Q3 and an NMOS transistor Q4. As illustrated in FIG. 2B, a gate and a drain of the PMOS transistor Q3 is connected to a gate and a drain, respectively, of the NMOS transistor Q4.

Figure 2C:
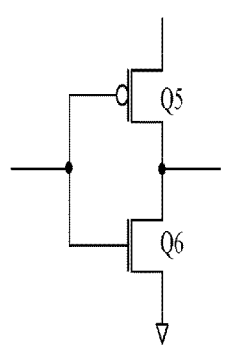

FIG. 2C illustrates an exemplary common gate and drain with ground connection for a PMOS transistor Q5 and an NMOS transistor Q6. As illustrated in FIG. 2C, a gate and a drain of the PMOS transistor Q5 is connected to a gate and a drain, respectively, of the NMOS transistor Q6. A source of the NMOS transistor Q6 is connected to a ground potential.

Figure 2D:
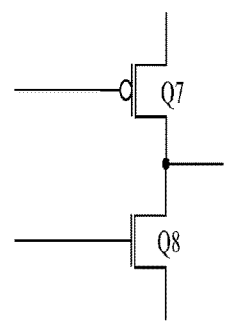

FIG. 2D illustrates an exemplary common drain configuration for a PMOS transistor Q7 and an NMOS transistor Q8. As illustrated in FIG. 2D, a drain of the PMOS transistor Q7 is connected to a drain of the NMOS transistor Q8.

Figure 2E:
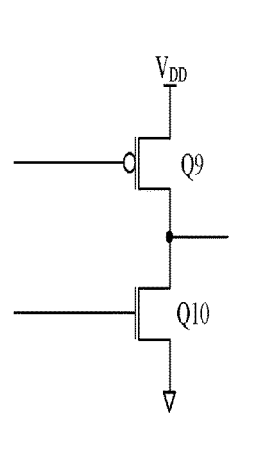

FIG. 2E illustrates an exemplary common drain with power and ground connections configuration for a PMOS transistor Q9 and an NMOS transistor Q10. As illustrated in FIG. 2E, a drain of the PMOS transistor Q9 is connected to a drain of the NMOS transistor Q10. A source of the PMOS transistor Q9 is connected to a power source $V_{DD}$. A source of the NMOS transistor Q10 is connected to a ground potential.

Figure 2F:
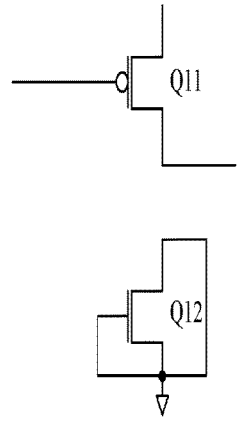

FIG. 2F illustrates an exemplary configuration for a single PMOS transistor Q11. As described above in FIG. 1A, the analog standard cells have a height of one standard cell. To maintain this one standard cell height, the analog standard cell for the exemplary configuration illustrated in FIG. 2F includes a dummy NMOS transistor Q12. As illustrated in FIG. 2F, a source, a drain, and a gate of the NMOS transistor Q12 are connected to a ground potential.

Figure 2G:
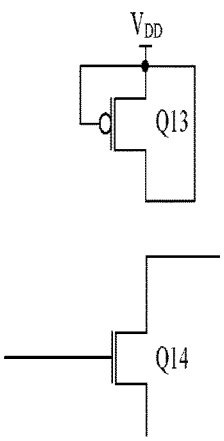

FIG. 2G illustrates an exemplary configuration for a single NMOS transistor Q14. As described above in FIG. 1A, the analog standard cells have a height of one standard cell. To maintain this one standard cell height, the analog standard cells for the exemplary configuration illustrated in FIG. 2G includes a dummy PMOS transistor Q13. As illustrated in FIG. 2G, a source, a drain, and a gate of the PMOS transistor Q13 are connected to a power source $V_{DD}$.

Figure 2H:
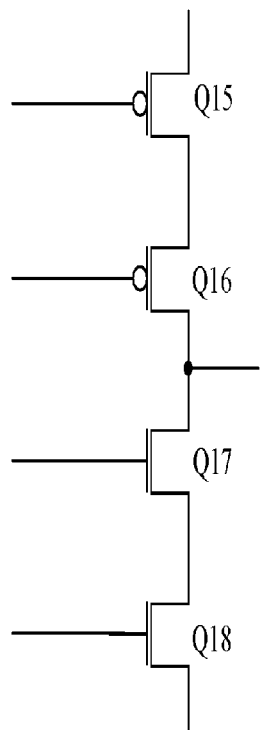

FIG. 2H illustrates an exemplary series configuration for PMOS transistors Q15 and Q16 and NMOS transistors Q17 and Q18. As illustrated in FIG. 2H, a source of the PMOS transistor Q15 is connected to a drain of the PMOS transistor Q16 and a drain of the NMOS transistor Q17 is connected to a source of the NMOS transistor Q18.

Figure 2I:
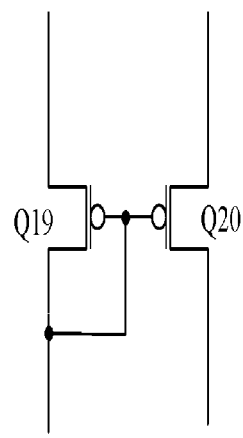

FIG. 2I illustrates an exemplary mirror configuration for PMOS transistors Q19 and Q20. As illustrated in FIG. 2I, the PMOS transistors Q19 and Q20 are configured and arranged to implement a current mirror.

Figure 2J:
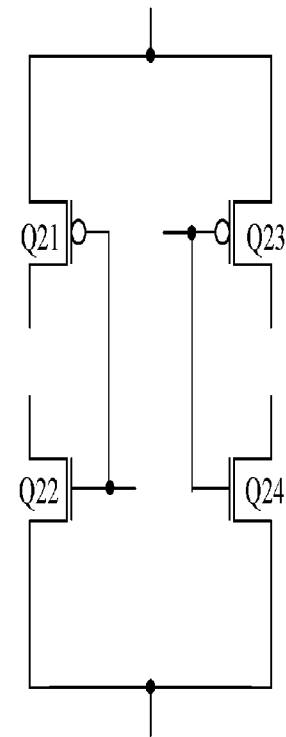

FIG. 2J illustrates an exemplary differential configuration for PMOS transistors Q21 and Q23 and NMOS transistors Q22 and Q24. As illustrated in FIG. 2J, the PMOS transistors Q21 and Q23 and the NMOS transistors Q22 and Q24 are configured and arranged to implement a differential pair of transistors.

Exemplary Analog Standard Cells

Figure 3A:
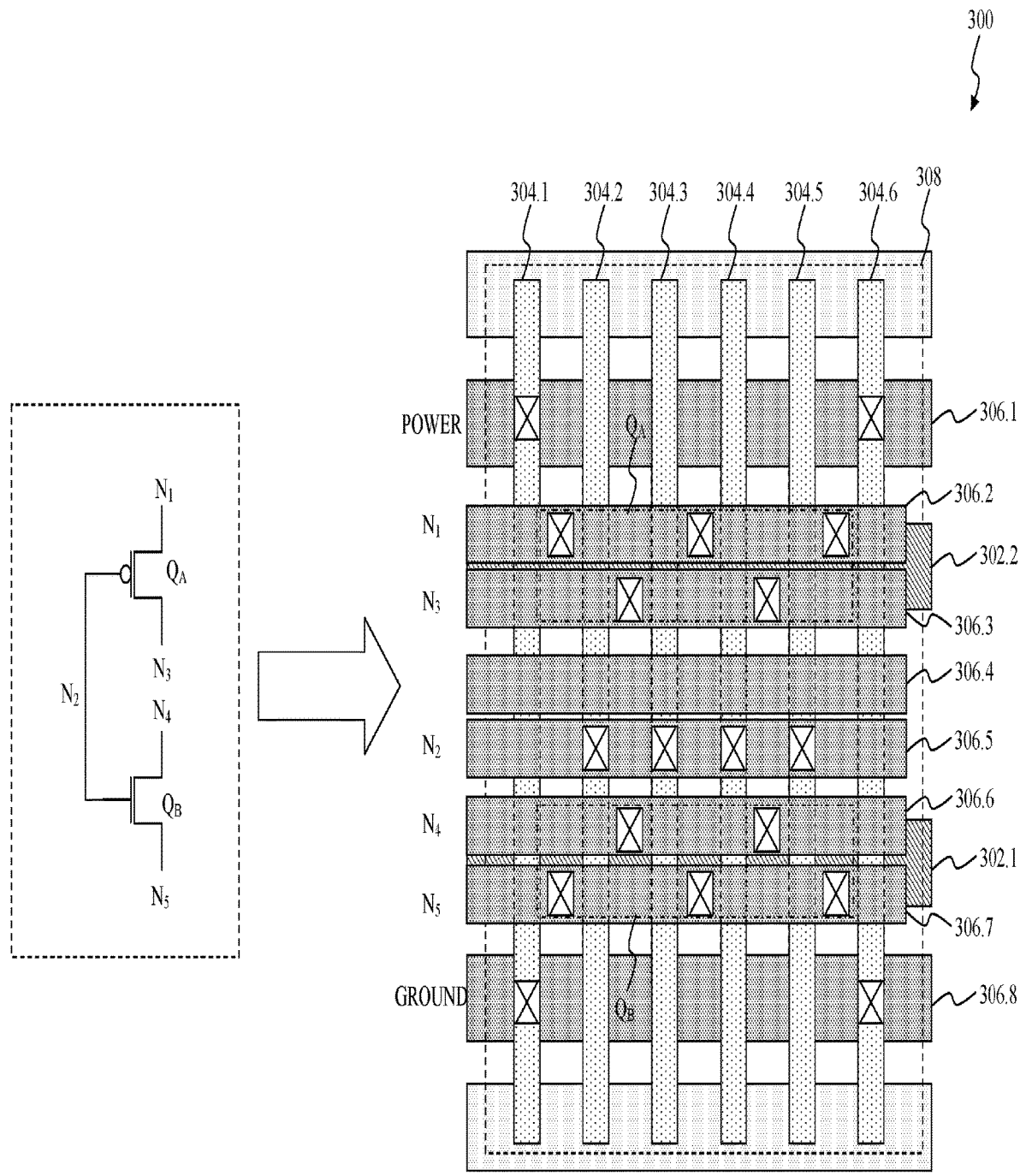
FIG. 3A through FIG. 3C graphically illustrate exemplary analog standard cells that can be implemented within libraries of analog standard cells according to exemplary embodiments of the present disclosure.
Figure 3B:
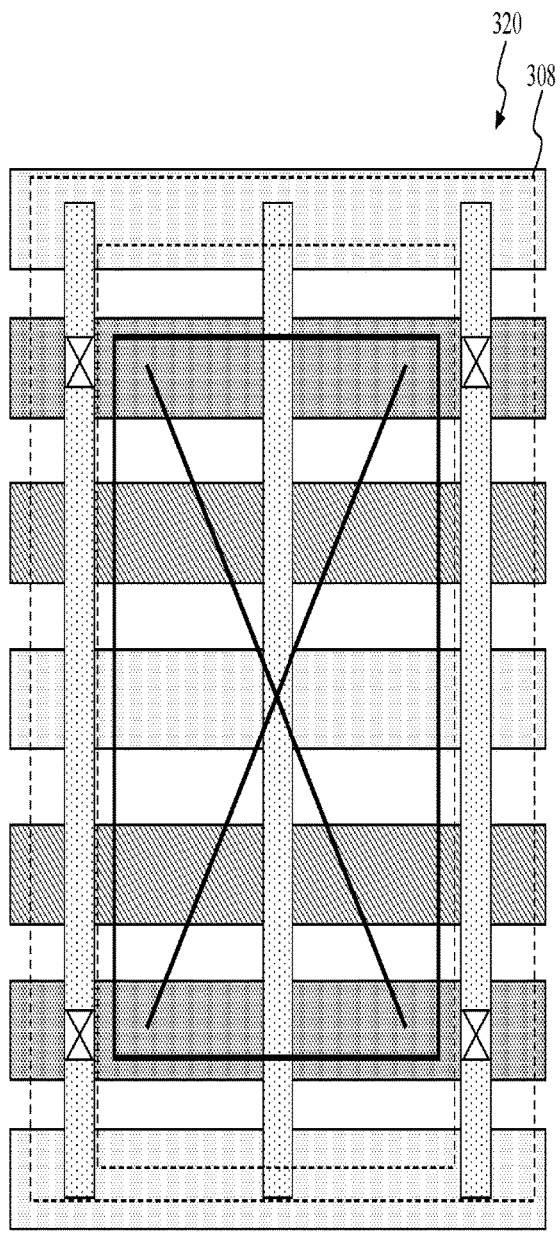
Figure 3C:
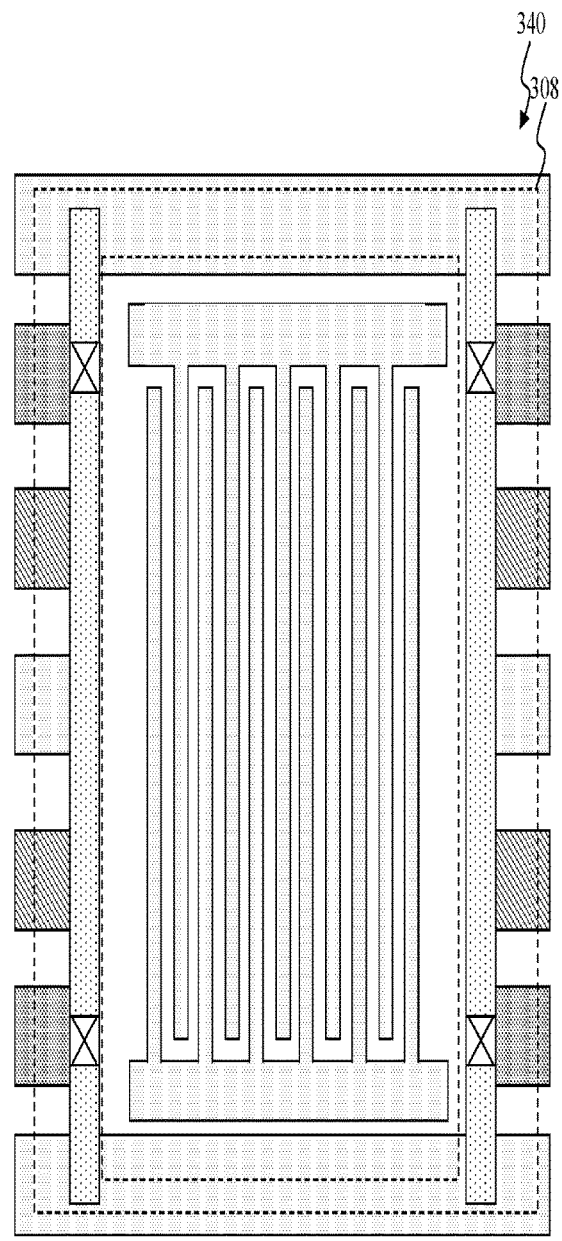

FIG. 3A through FIG. 3C graphically illustrate exemplary analog standard cells that can be implemented within libraries of analog standard cells according to exemplary embodiments of the present disclosure. Those skilled in the relevant art(s) will recognize the libraries of analog standard cells are not limited to the exemplary analog standard cells as to be described in detail in FIG. 3A through FIG. 3C. As described above, libraries of analog standard cells can include one or more standard cells, such as the analog standard cells 158.1 through 158.k as described above in FIG. 1E, having different common configurations and/or different common arrangements.

FIG. 3A illustrates an analog standard cell 300 having a common gate configuration and/or arrangement. In the exemplary embodiment illustrated in FIG. 3A, the analog standard cell 300 includes one or more PMOS transistors and/or one or more NMOS transistors that are defined in terms of planar geometric shapes which correspond to active diffusion regions 302.1 and 302.2 within one or more diffusion layers, polysilicon regions 304.1 through 304.6 within one or more polysilicon layers, metal regions 306.1 through 306.8 within one or more metal layers and/or one or more interconnections, such as contacts or vias to provide some examples, between the regions. The active diffusion regions 302.1 and 302.2, illustrated using hashing in FIG. 3A, represent active diffusion regions upon which active regions of the PMOS transistor $Q_A$ and the NMOS transistor $Q_B$, respectively, can be formed. In the exemplary embodiment illustrated in FIG. 3A, the analog standard cell 300 can be characterized as having one cell height to accommodate the active diffusion regions 302.1 and 302.2 for formation of the PMOS transistor $Q_A$ and the NMOS transistor $Q_B$, respectively.

The polysilicon regions 304.1 through 304.6, illustrated using dotted shading in FIG. 1, overlap active diffusion regions 302.1 and 302.2 to form the PMOS transistor $Q_A$ and the NMOS transistor $Q_B$. Typically, the active diffusion region 302.1 is doped with impurity atoms of an acceptor type, such as boron or aluminum to provide some examples, that are capable of accepting an electron to form active regions of p-type metal-oxide-semiconductor (PMOS) devices. The active diffusion region 302.2 is doped with impurity atoms of a donor type, such as phosphorus, arsenic, or antimony to provide some examples, that are capable of donating an electron to form active regions of n-type metal-oxide-semiconductor (NMOS) devices. The polysilicon regions 304.1 through 304.6 can be doped with impurity atoms of the acceptor type or of the donor type. Although not shown, the semiconductor devices, as well other semiconductor devices to be described below, can be formed within specially implanted regions, known as wells, that can increase the number of carrier holes and/or carrier electrons located in the semiconductor substrate. The semiconductor substrate can be implanted with the atoms of the acceptor type and atoms of the donor type to fabricate a specially implanted p-type well region and a specially implanted n-type well region, respectively.

The metal regions 306.1 through 306.8, illustrated using solid gray shading in FIG. 3A, represent regions of metal within the analog standard cell 300. For example, the metal regions 306.2 through 306.7 can be utilized to route various signals within the analog standard cell 300. As another example, the metal regions 306.1 and 306.8 can be utilized to route a supply voltage and ground, respectively, to the analog standard cell 300.

The one or more interconnections, illustrated as a squared "x" in FIG. 3A, couple various regions within the analog standard cell 300. Typically, the one or more interconnections can include contacts to form interconnections between active diffusion regions 302.1 and 302.2 and the metal regions 306.1 through 306.8 and/or between the polysilicon regions 304.1 through 304.6 and the metal regions 306.1 through 306.8.

In the exemplary embodiment illustrated in FIG. 3A, the polysilicon regions 304.1 and 304.6 and the metal regions 306.1 and 306.8 are arranged to form an analog standard cell boundary 308. In this exemplary embodiment, the electronic architectural design layout for the analog electrical circuit, such as the common gate configuration illustrated in FIG. 3A to provide an example, can be situated within the analog standard cell boundary 308. In some situations, the analog standard cell boundary 308 of the analog standard cell 300 can be connected to others analog standard cell boundaries of others analog standard cells and these analog standard cells can be connected using various metal layers, not illustrated in FIG. 3A, to form other, larger, analog standard cells. Although the analog standard cell 300 is illustrated in FIG. 3A as including active components, such as the PMOS transistor $Q_A$ and the NMOS transistor $Q_B$, within the analog standard cell boundary 308, those skilled in the relevant art(s) will recognize passive components can also be implemented within the analog standard cell boundary 308 without departing from the spirit and scope of the present disclosure. For example, FIG. 3B illustrates an analog standard cell 320 having a High-Resistance (High-R) Poly Resistance within the analog standard cell boundary 308 and FIG. 3C illustrates an analog standard cell 340 having a MOM (Metal-Oxide-Metal) capacitor within the analog standard cell boundary 308.

Exemplary Operation of the Placing and Routing Application

Figure 4A:
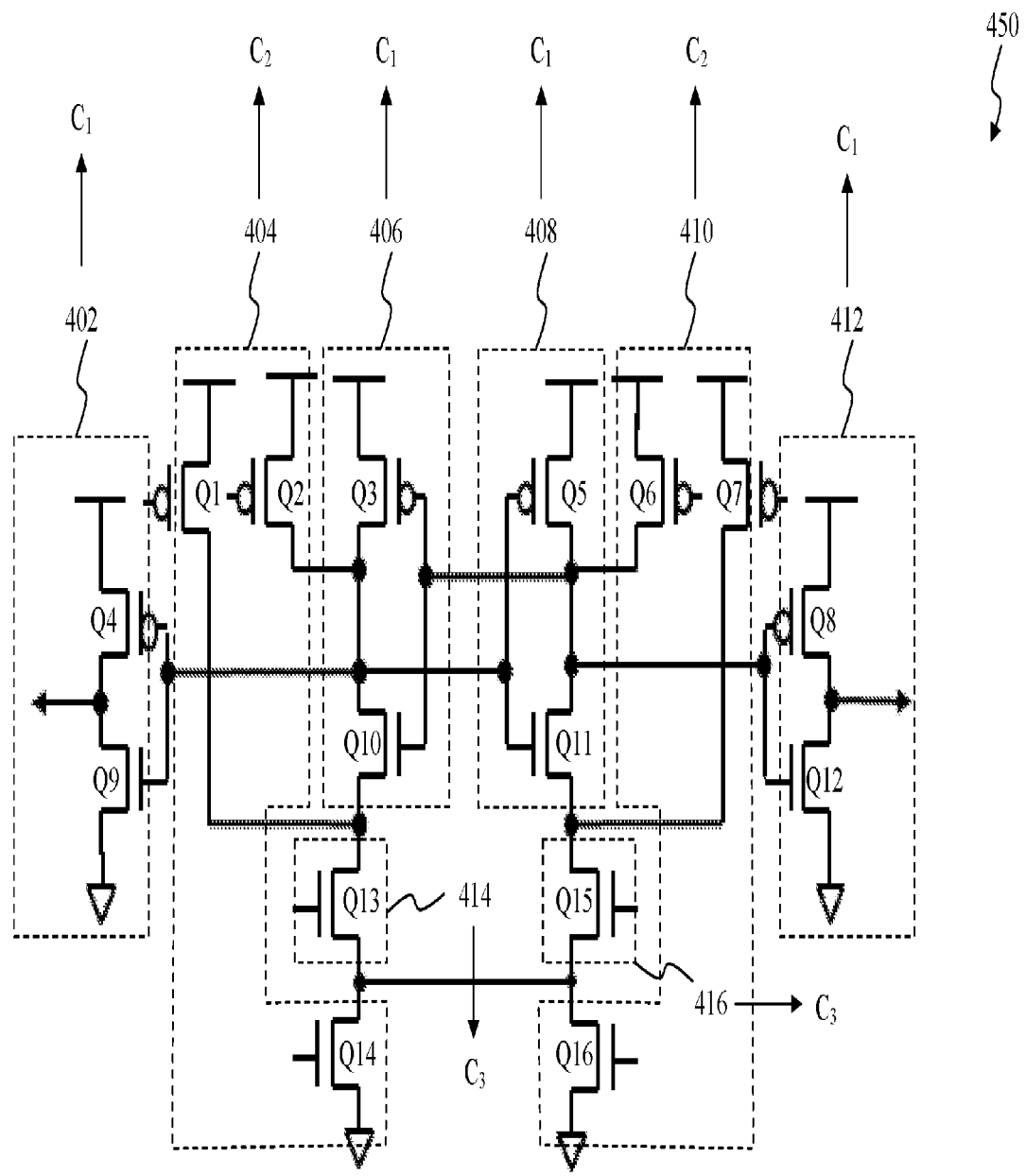
FIG. 4A through FIG. 4D graphically illustrate an exemplary operation of a placing and routing application according to an exemplary embodiment of the present disclosure.

FIG. 4A through FIG. 4D graphically illustrate an exemplary operation of a placing and routing application according to an exemplary embodiment of the present disclosure. The exemplary embodiment illustrated in FIG. 4A through FIG. 4D graphically illustrates an exemplary operation of a placing and routing application, such as the placing and routing application 104 as described above in FIG. 1A through FIG. 1E in translating a schematic diagram 450 of an analog electrical circuit into an electronic architectural design layout for the analog electrical circuit. As illustrated in FIG. 4A, the analog electrical circuit includes PMOS transistors Q1 through Q8 and NMOS transistors Q9 through Q16. In the exemplary embodiment illustrated in FIG. 4A, the PMOS transistor Q4 and the NMOS transistor Q9 form an analog circuit 402. The PMOS transistors Q1 and Q2 and the NMOS transistor Q14 form an analog circuit 404. The PMOS transistors Q3 and Q10 form an analog circuit 406. The PMOS transistors Q5 and Q11 form an analog circuit 408. The PMOS transistors Q6 and Q7 and the NMOS transistor 16 form an analog circuit 410. The PMOS transistor Q8 and the NMOS transistor Q12 form an analog circuit 412. The NMOS transistor Q13 forms an analog circuit 414. The NMOS transistor Q15 forms an analog circuit 416.

In the exemplary embodiment illustrated in FIG. 4A, the placing and routing application logically assigns the analog circuits 402 through 416 to categories of analog circuits $C_1$ through $C_3$. In this exemplary embodiment, the category of analog circuits $C_1$ is associated with a common gate and common drain configuration having power connections. The category of analog circuits $C_2$ is associated with a common gate configuration having power and ground connections. The category of analog circuits $C_3$ is associated with a single transistor configuration. As illustrated in FIG. 4A, the analog circuits 402, 406, 408, and 412 have common gates and drains with power connections and are logically assigned to the category of analog circuits $C_1$. For example, the gate of PMOS transistor Q4 is connected to the gate of NMOS transistor Q9, the drain of PMOS transistor Q4 is connected to the drain of NMOS transistor Q9, and the source of PMOS transistor Q4 is connected to a power source. The analog circuits 404 and 410 have common drains with power and ground connections and are logically assigned to the category of analog circuits $C_2$. The analog circuits 414 and 416 have single transistors and are logically assigned to the category of analog circuits $C_3$.

Figure 4B:
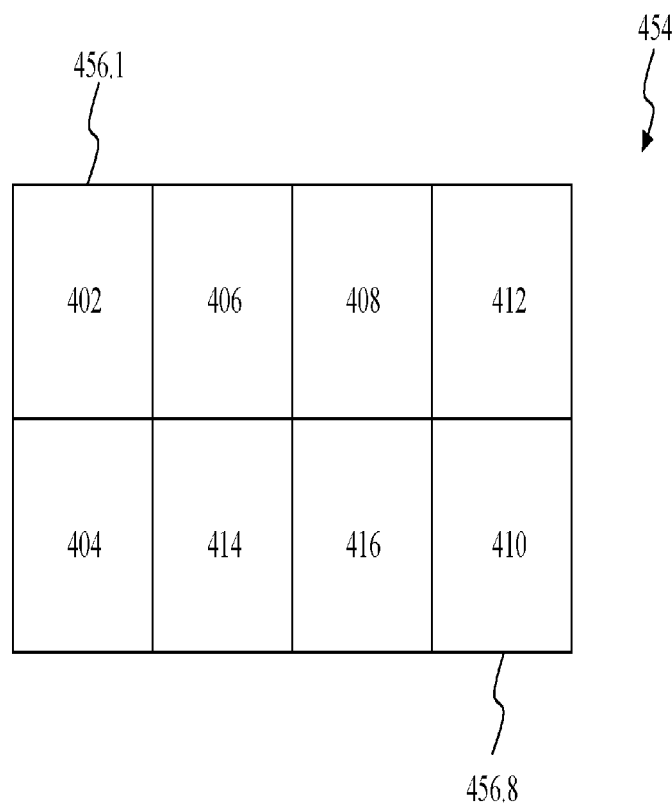

As illustrated in FIG. 4B, the placing and routing application partitions real estate 454 from the electronic architectural design layout into analog placement sites 456.1 through 456.8 to develop a floor plan for placement of analog standard cells of the analog circuits 402 through 416. In the exemplary embodiment illustrated in FIG. 1C, the analog placement sites 456.1 through 456.8 are arranged as a series of rows and a series of rows to form a matrix of analog placement sites. However, other arrangements of the analog placement sites 456.1 through 456.8 are possible as will be apparent to those skilled in the relevant art(s) without departing from the spirit and scope of the present disclosure. The placing and routing application thereafter assigns the analog circuits 402 through 416 to corresponding analog placement sites from among the analog placement sites 456.1 through 456.8.

Figure 4C:
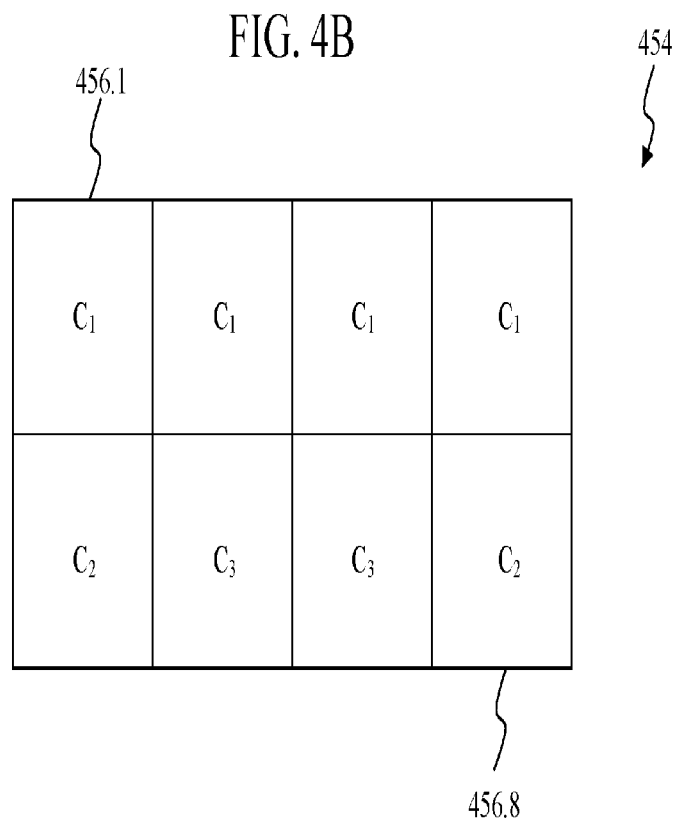

As illustrated in FIG. 4C, the placing and routing application designates the analog placement sites 456.1 through 456.8 with their corresponding categories of analog circuits from among the categories of analog circuits $C_1$ through $C_3$. In the exemplary embodiment illustrated in FIG. 1D, the analog circuit 402, which is assigned to the category of analog circuits $C_1$, is assigned to the analog placement site 456.1 and the analog circuit 410 which is assigned to the category of analog circuits $C_2$, is assigned to the analog placement site 456.8. In this exemplary embodiment, the placing and routing application designates the analog placement site 456.1 with the category of analog circuits $C_1$ and the analog placement site 456.8 with the category of analog circuits $C_2$.

Figure 4D:
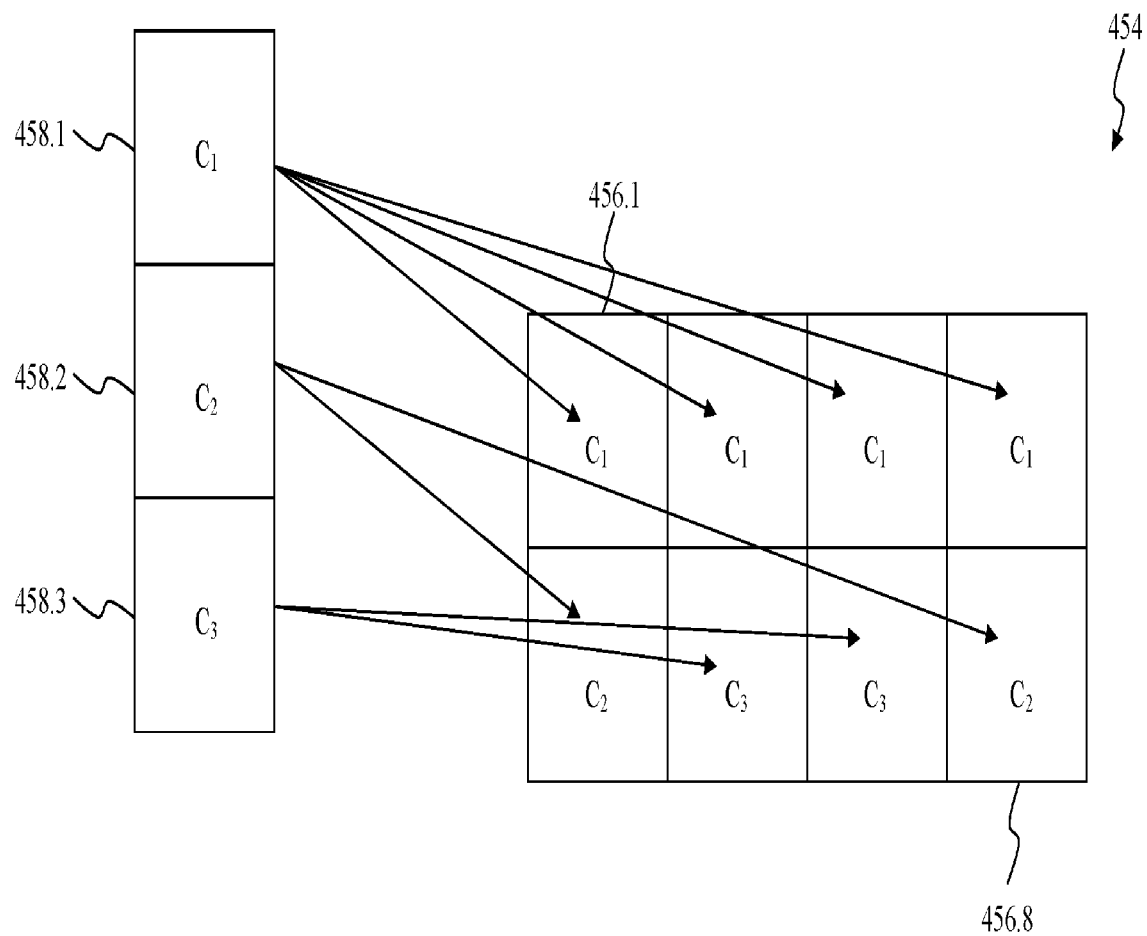

As illustrated in FIG. 4D, the placing and routing application retrieves analog standard cells 458.1 through 458.3 from the libraries of analog standard cells 110 as illustrated in FIG. 1A. In the exemplary embodiment illustrated in FIG. 4D, each analog standard cell from among the analog standard cells 458.1 through 458.3 is associated with a category of from among the categories of analog circuits $C_1$ through $C_3$. The placing and routing application thereafter places the analog standard cells 458.1 through 458.3 into analog placement sites from among the analog placement sites 456.1 through 456.8 which correspond to their categories of analog circuits $C_1$ through $C_3$. In the exemplary embodiment illustrated in FIG. 4D, the placing and routing application retrieves the analog standard cell 458.1 which is associated with the category of analog circuits $C_1$ and places the analog standard cell 458.1 into the analog placement sites 456.1 through 456.4 which are similarly assigned to the category of analog circuits $C_1$. Similarly, the placing and routing application retrieves the analog standard cell 458.3 which is associated with the category of analog circuits $C_3$ and places the analog standard cell 458.3 into the analog placement sites 456.6 and 456.7 which are similarly assigned to the category of analog circuits $C_3$. Once the placing and routing application places the analog standard cells 458.1 through 458.3, connects the analog standard cells 458.1 through 458.3 in accordance with the schematic diagram to form the electronic architectural design layout for the analog circuitry of the electronic device.

Figure 5:
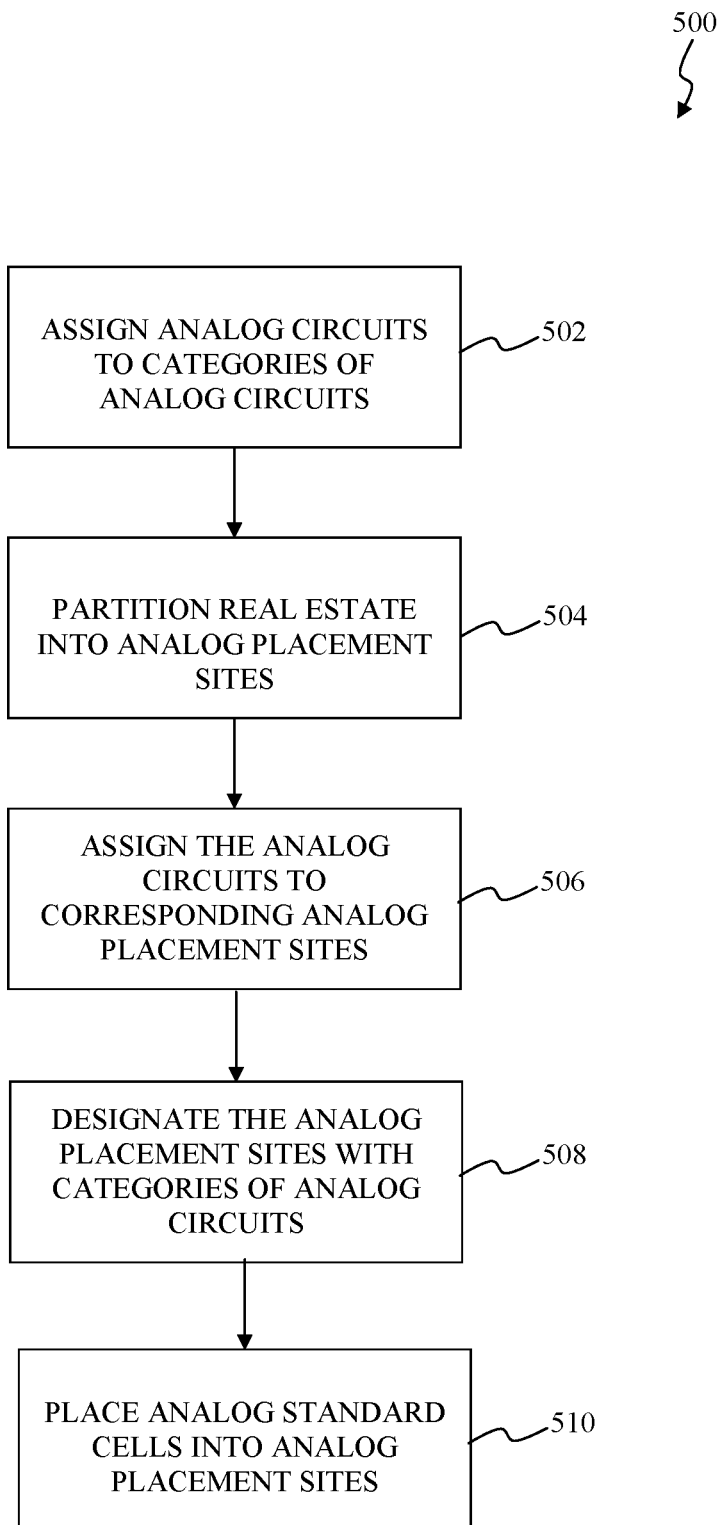
FIG. 5 illustrates a flowchart of exemplary operations for an exemplary placing and routing application of the exemplary electronic design platform according to an exemplary embodiment of the present disclosure.

Exemplary Operational Control Flow for an Exemplary Placing and Routing Application of the Electronic Design Platform FIG. 5 illustrates a flowchart of exemplary operations for an exemplary placing and routing application of the exemplary electronic design platform according to an exemplary embodiment of the present disclosure. The disclosure is not limited to this operational description. Other operational control flows are within the scope and spirit of the present disclosure. The following discussion describes an exemplary operational control flow 500 for an electronic design platform, such as the electronic design platform 104 as described above in FIG. 1A, to translate analog circuitry of a schematic diagram to form an electronic architectural design layout for the analog circuitry of the electronic device.

At operation 502, the operational control flow 500 logically assigns analog circuits, such as the analog circuits 152.1 through 152.n to provide an example, of the analog circuitry to categories of analog circuits, such as the categories of analog circuits $C_1$ through $C_k$ to provide an example. The operational control flow 500_logically assigns each of the analog circuits to a corresponding category of analog circuits from among the categories of analog circuits that is associated with same common configuration and/or common arrangement as the analog circuit. In some situations, one or more of the categories of analog circuits can be assigned to multiple analog circuits.

At operation 504, the operational control flow 500 partitions real estate from the electronic architectural design layout into analog placement sites, such as the analog placement sites 156.1 through 156.n to provide an example, to develop a floor plan for placement of analog standard cells for the analog circuits.

At operation 506, the operational control flow 500 assigns the analog circuits to corresponding analog placement sites from among the analog placement sites. In an exemplary embodiment, the operational control flow 500 uses the schematic diagram as a roadmap to assign the analog circuits to their corresponding analog placement sites in the real estate such that analog circuits from among the neighboring one another in the schematic diagram similarly neighbor each other in the real estate.

At operation 508, the operational control flow 500 designates the analog placement sites with their corresponding categories of analog circuits from among the categories of analog circuits.

At operation 510, the operational control flow 500 places analog standard cells, such as the analog standard cells 158.1 through 158.k to provide an example, into analog placement sites from among the analog placement sites which correspond to their categories of analog circuits. For example, the operational control flow 500 places a first analog standard cell which is associated with a first category of analog circuits into analog placement sites which are similarly assigned to the first category of analog circuits. Similarly, the placing and routing application 104 places a $k^{th}$ analog standard cell which is associated with a $k^{th}$ category of analog circuits into the analog placement sites which are similarly assigned to the $k^{th}$ category of analog circuits. Once the operational control flow 500 places the analog standard cells, the operational control flow 500 connects the analog standard cells in accordance with the schematic diagram to form the electronic architectural design layout for the analog circuitry of the electronic device.

Exemplary Computer System for Implementing the Exemplary Design Platform

Figure 6:
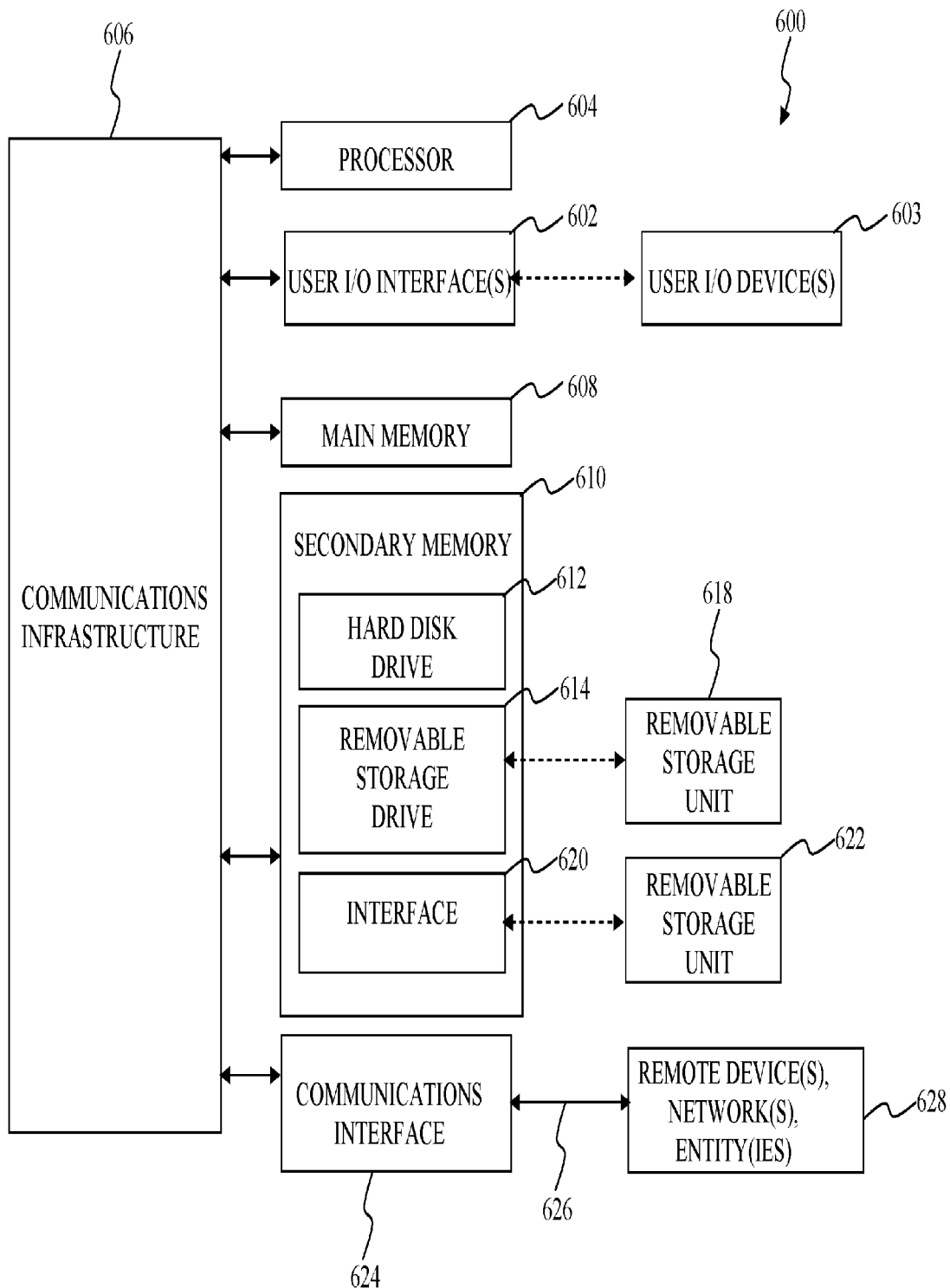
FIG. 6 illustrates a block diagram of an exemplary computer system for implementing the exemplary design platform according to an exemplary embodiment of the present disclosure.

FIG. 6 illustrates a block diagram of an exemplary computer system for implementing the exemplary design platform according to an exemplary embodiment of the present disclosure. A computer system 600 can be used to implement the electronic design platform 100 and/or the electronic design platform 120. However, in some situations, more than one computer system 600 can be used to implement the electronic design platform 100. After reading this description, it will become apparent to a person skilled in the relevant art how to implement embodiments using other computer systems and/or computer architectures.

The computer system 600 includes one or more processors 604, also referred to as central processing units, or CPUs, to execute the synthesis application 102, the placing and routing application 104, the simulation application 106, and/or the verification application 108 as above in FIG. 1A. The one or more processors 604 can be connected to a communication infrastructure or bus 606. In an exemplary embodiment, one or more of the one or more processors 604 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 600 also includes user input/output device(s) 603, such as monitors, keyboards, pointing devices, etc., which communicate with communication infrastructure 606 through user input/output interface(s) 602.

The computer system 600 also includes a main or primary memory 608, such as a random-access memory (RAM) to provide an example. The main memory 608 can include one or more levels of cache. The main memory 608 has stored therein control logic (i.e., computer software) and/or data, such as the libraries of analog standard cells 110 as described above in FIG. 1A. The computer system 600 can also include one or more secondary storage devices or memory 610 to store the libraries of analog standard cells 110 as described above in FIG. 1A. The one or more secondary storage devices or memory 610 can include, for example, a hard disk drive 612 and/or a removable storage device or drive 614. The removable storage drive 614 may be a floppy disk drive, a magnetic tape drive, a compact disk drive, an optical storage device, tape backup device, and/or any other storage device/drive. The removable storage drive 614 may interact with a removable storage unit 618. The removable storage unit 618 includes a computer usable or readable storage device having stored thereon computer software (control logic) and/or data. The removable storage unit 618 may be a floppy disk, magnetic tape, compact disk, DVD, optical storage disk, and/any other computer data storage device. The removable storage drive 614 reads from and/or writes to removable storage unit 618 in a well-known manner.

According to an exemplary embodiment, the one or more secondary storage devices or memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 600 may further include a communication or network interface 624. The communication or network interface 624 enables the computer system 600 to communicate and interact with any combination of remote devices, remote networks, remote entities, etc. (individually and collectively referenced by reference number 628). For example, the communication or network interface 624 may allow the computer system 600 to communicate with the remote devices 628 over a communications path 626, which may be wired and/or wireless, and which may include any combination of LANs, WANs, the Internet, etc. Control logic and/or data may be transmitted to and from the computer system 600 via communication path 626. In an exemplary embodiment, the remote devices 628 can include one or more computing devices, processors, controllers, or other devices that will be apparent to those skilled in the relevant art(s) without departing from the spirit and the scope of the present disclosure, executing the electronic design platform 100 as described above in FIG. 1A. In another exemplary embodiment, the remote devices 628 can include one or more computing devices, processors, controllers, or other devices that will be apparent to those skilled in the relevant art(s) without departing from the spirit and the scope of the present disclosure, executing the electronic design platform 120 as described above in FIG. 1AB.

In an embodiment, a tangible apparatus or article of manufacture comprising a non-transitory computer-readable medium having control logic (software) stored thereon is also referred to herein as a computer program product or program storage device. This includes, but is not limited to, the computer system 600, the main memory 608, the secondary memory 610, and the removable storage units 618 and 622, as well as tangible articles of manufacture embodying any combination of the foregoing. Such control logic, that when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

CONCLUSION

The foregoing Detailed Description discloses a system for developing an electronic architectural design layout for analog circuitry of an electronic device. The system includes a memory and a processor. The memory stores analog standard cells. The processor executes a placing and routing application. The placing and routing application, when executed by the processor, causes the processor to: logically assign an analog circuit from among analog circuits to a category of analog circuits from among the categories of analog circuits, each category of analog circuits from among the categories of analog circuits being associated with a common configuration and/or a common arrangement, partition real estate from the electronic architectural design layout into analog placement sites, assign the analog circuit to an analog placement site from among the analog placement sites, designate the analog placement site as being associated with the category of analog circuits, and place an analog standard cell that is associated with the category of analog circuits from among the analog standard cells into the analog placement site The foregoing Detailed Description additionally discloses a method for developing an electronic architectural design layout for analog circuitry of an electronic device. The method includes logically assigning, by a processor executing a placing and routing application, an analog circuit from among analog circuits to a category of analog circuits from among the categories of analog circuits, each category of analog circuits from among the categories of analog circuits being associated with a common configuration and/or a common arrangement; retrieving, by the processor, an analog standard cell from among analog standard cells that is associated with the category of analog circuits; and placing, by the processor, the analog standard cell into an analog placement site assigned to the analog circuitry from among analog placement sites.

The foregoing Detailed Description further discloses a non-transitory computer-readable medium having computer program code recorded thereon that, when executed by a processor, causes the processor to perform operations. The operations include: logically assigning an analog circuit from among analog circuits of an electronic device to a category of analog circuits from among categories of analog circuits, each category of analog circuits from among the categories of analog circuits being associated with a common configuration and/or a common arrangement; retrieving an analog standard cell from among analog standard cells that is associated with the category of analog circuits; placing the analog standard cell into an analog placement site assigned to the analog circuitry from among analog placement sites; retrieving a digital standard cell from among digital standard cells that is associated with a digital circuit from among digital circuits of the electronic device; placing the digital standard cell into a digital placement site from among digital placement sites; and connecting the analog standard cell and the digital standard cell to form an electronic architectural design layout for the electronic device.

The foregoing Detailed Description outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A system for developing an electronic architectural design layout for circuitry of an electronic device, the system comprising:
    a memory that stores a plurality of categories of circuits, each category of circuits from among the plurality of categories of circuits being associated with a corresponding common configuration from among a plurality of common configurations; and
    a processor configured to execute a placing and routing application, the placing and routing application, when executed by the processor, configuring the processor to:
        assign a circuit from among a plurality of circuits of the circuitry to a category of circuits from among the plurality of categories of circuits that is associated with a similar corresponding common configuration as a configuration of the circuit,
        designate a placement site from among the electronic architectural design layout as being assigned to the category of circuits, and
        place a standard cell from among a plurality of standard cells that is associated with the category of circuits into the placement site.

2. The system of claim 1, wherein the placing and routing application, when executed by the processor, configures the processor to utilize a schematic diagram of the circuitry to assign the circuit to the category of circuits.

3. The system of claim 1, wherein the placing and routing application, when executed by the processor, configures the processor to receive an input from a peripheral device to assign the circuit to the category of circuits.

4. The system of claim 1, wherein the corresponding common configuration comprises:
    a common gate connection;
    a common drain connection;
    a common source connection; or
    a common bulk connection.

5. The system of claim 1, wherein the plurality of standard cells is characterized as having a uniform cell height.

6. The system of claim 5, wherein the uniform cell height comprises one cell height having a first horizontal active diffusion region for formation of p-type metal-oxide-semiconductor (PMOS) transistors and a second horizontal active diffusion region for formation of n-type metal-oxide-semiconductor (NMOS) transistors.

7. The system of claim 1, wherein the placing and routing application, when executed by the processor, configures the processor to partition the real estate into a series of rows and a series of columns to form a matrix of placement sites, the placement site being within the matrix of placement sites.

8. The system of claim 1, wherein the placing and routing application, when executed by the processor, configures the processor to assign the circuit to the placement site using a schematic diagram of the circuitry as a roadmap.

9. A method for developing an electronic architectural design layout for circuitry of an electronic device, the method comprising:
 storing, by a processor executing a placing and routing application, a plurality of categories of circuits, each category of circuits from among the plurality of categories of circuits being associated with a corresponding common configuration from among a plurality of common configurations;
 assigning, by the processor, a circuit from among a plurality of circuits of the circuitry to a category of circuits from among the plurality of categories of circuits that is associated with a similar corresponding common configuration as a configuration of the circuit;
 retrieving, by the processor, a standard cell from among a plurality of standard cells that is associated with the category of circuits; and
 placing, by the processor, the standard cell into a placement site from among the electronic architectural design layout that is assigned to the category of circuits.

10. The method of claim 9, wherein the assigning comprises:
 assigning the circuit to the category of circuits utilizing a schematic diagram of the circuitry.

11. The method of claim 10, wherein the assigning further comprises:
 receiving an input from a peripheral device to assign the circuit to the category of circuits.

12. The method of claim 9, wherein the plurality of standard cells is characterized as having a uniform cell height.

13. The method of claim 12, wherein the uniform cell height comprises one cell height having a first horizontal active diffusion region for formation of p-type metal-oxide-semiconductor (PMOS) transistors and a second horizontal active diffusion region for formation of n-type metal-oxide-semiconductor (NMOS) transistors.

14. A non-transitory computer-readable medium having computer program code recorded thereon that, when executed by a processor, causes the processor to perform operations, the operations comprising:
 creating a plurality of categories of circuits, each category of circuits from among the plurality of categories of circuits being associated with a corresponding common configuration from among a plurality of common configurations and/or a corresponding common arrangement from among a plurality of common arrangements,
 assigning a circuit from among a plurality of circuits of the circuitry to a category of circuits from among the plurality of categories of circuits that is associated with a similar corresponding common configuration as a configuration of the circuit and/or a similar corresponding common arrangement as an arrangement of the circuit,
 retrieving a standard cell from among a plurality of standard cells that is associated with the category of circuits;
 placing the standard cell into a placement site assigned to the circuitry from among a plurality of placement sites;
 retrieving a digital standard cell from among a plurality of digital standard cells that is associated with a digital circuit from among a plurality of digital circuits of the electronic device;
 placing the digital standard cell into a digital placement site from among a plurality of digital placement sites; and
 connecting the standard cell and the digital standard cell to form an electronic architectural design layout for the electronic device.

15. The non-transitory computer-readable medium of claim 14, wherein the assigning comprises:
 utilizing a schematic diagram of the circuitry to logically assign the circuit to the category of circuits.

16. The non-transitory computer-readable medium of claim 15, wherein the assigning comprises:
 receiving an input from a peripheral device to logically assign the circuit to the category of circuits.

17. The non-transitory computer-readable medium of claim 14, wherein the corresponding common configuration or the corresponding common arrangement comprises:
 a common gate connection;
 a common drain connection;
 a common source connection;
 a common bulk connection;
 a power connection; or
 a ground connection.

18. The non-transitory computer-readable medium of claim 14, wherein the plurality of standard cells is characterized as having a uniform cell height.

19. The non-transitory computer-readable medium of claim 18, wherein the uniform cell height comprises one cell height having a first horizontal active diffusion region for formation of p-type metal-oxide-semiconductor (PMOS) transistors and a second horizontal active diffusion region for formation of n-type metal-oxide-semiconductor (NMOS) transistors.

20. The non-transitory computer-readable medium of claim 14, wherein the operations further comprise:
 partitioning real estate from the electronic architectural design layout into a plurality of placement sites;
 assigning the circuit to the placement site from among the plurality of placement sites; and
 designating the placement site as being associated with the category of circuits.

* * * * *